Oct. 23, 1945.  G. J. MEYER  2,387,339
CHUCK
Filed Aug. 21, 1943
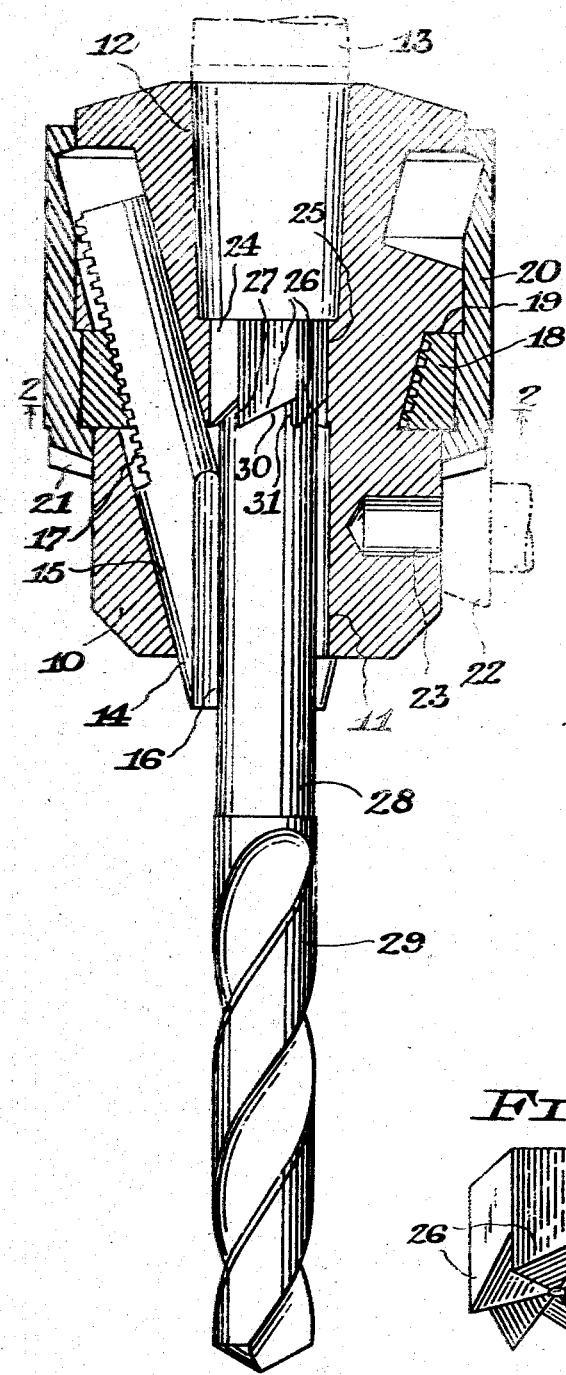
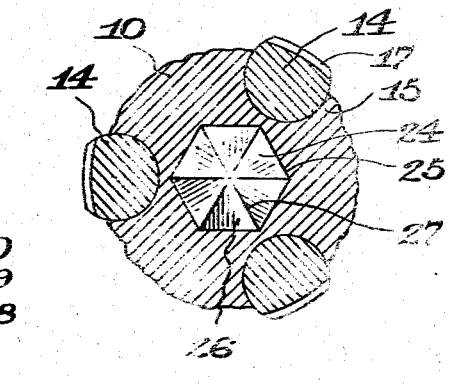
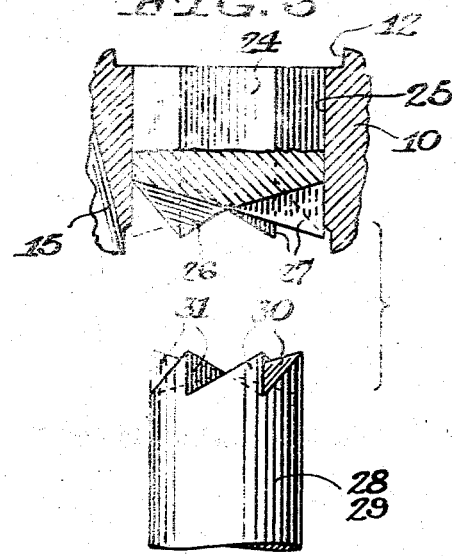
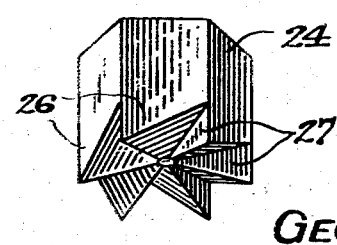
INVENTOR
GEORGE J. MEYER
BY Christopher L. Waal
ATTORNEY Patented Oct. 23, 1945

2,387,339

UNITED STATES PATENT OFFICE 2,387,339

CHUCK

George J. Meyer, Milwaukee, Wis.

Application August 21, 1943, Serial No. 499,532

4 Claims. (Cl. 279—9)

The present invention relates to chucks for drills and other tools and more particularly to means for effecting a positive drive between a chuck and a tool shank.

A well-known type of chuck includes adjustable clamping jaws for centering and frictionally gripping a straight-shank drill, the frictional grip on the drill shank being relied on to prevent relative rotation between the chuck and the drill. If heavy drilling is attempted or if the chuck jaws are insufficiently tightened, slippage will occur in a chuck of this type, resulting in damage to the jaws and scoring of the drill shank. Excessive tightening of the jaws also has a tendency to damage the jaws and the associated screw threads.

It is an object of the present invention to provide an improved tool chuck of this general type having simple and durable means for positively coupling the chuck to a drill or other tool, thus preventing slipping of the tool with respect to the shank-centering jaws and avoiding the necessity for high clamping pressures between the jaws and the tool shank.

Another object of the invention is to provide improved positive shank-driving means readily applicable to existing tool chucks of this type.

A further object is to provide positive shank-driving means which will accommodate tool shanks of various diameters, and which will require only a relatively simple alteration of existing straight-shank drills and other tools.

A still further object is to perfect details of construction generally.

The invention further consists in the several features hereinafter described and claimed.

In the accompanying drawing,

Fig. 1 is a sectional elevation of an adjustable jaw chuck embodying tool-driving means of the invention;

Fig. 2 is a transverse sectional view taken generally on the line 2—2 of Fig. 1;

Fig. 3 is a detail elevation, partly in section, of a shank-driving clutch member and a complementary drill shank disconnected therefrom, and Fig. 4 is a perspective view of the clutch member.

In the drawing, 10 designates a chuck body having front and rear axial openings or bores 11 and 12, the rear opening 12 being tapered to form a socket for a mounting arbor 13, and the front opening 11 being adapted to receive therein the cylindrical shank of a drill or other tool. Reciprocatory rod-like clamping jaws 14, usually three in number, are longitudinally slidable in converging guide bores or channels 15 formed in the chuck body and have parallel gripping edges 16 for centering and frictionally clamping the cylindrical drill shank. The jaws 14 are provided at their outer sides with rack teeth or threads 17 engageable with a ring nut 18 rotatably fitting in an annular groove 19 formed concentrically about the chuck body. The ring nut is fixed to the interior of a rotatable sleeve 20 surrounding the chuck body, the rotation of the sleeve with respect to the chuck body serving to effect simultaneous adjustment of the clamping jaws. The sleeve is here shown to be provided with gear teeth 21 around the front edge thereof to permit tightening of the sleeve by the usual pinion key 22 detachably journalled in any one of several radial bores 23 (one being shown) formed in the chuck body. In some instances the sleeve gear 21 is omitted, the sleeve being tightened by hand.

The chuck thus far described is of conventional construction and operates in the usual manner, the shiftable clamping jaws 14 centering and frictionally gripping the drill shank. In this type of chuck the frictional grip serves to drive the drill.

In accordance with the present invention the chuck is arranged to engage the drill in a positive manner so as to prevent relative slipping of the chuck and drill. The coupling or driving means of the invention comprises a toothed clutch member 24 in the form of a hardened steel block or plug of hexagonal or other non-circular shape rigidly secured in the chuck body 10 at the inner end of the tool-receiving opening 11, the block being arranged coaxially of the chuck body. The block 24 is conveniently made from a short length of tool steel bar stock, and is conveniently mounted by pressing the block into a hexagonal opening 25 formed in the chuck body between the axial bores 11 and 12. Any tendency for the block to shift rearwardly will be resisted by the arbor 13. In an existing chuck the opening 25 can readily be formed by drilling an axial hole between the end bores 11 and 12 and enlarging the hole to hexagonal shape, the clutch being insertible through the end bore 12. The clutch block is provided at its front end or face with teeth or jaws 26, preferably of ratchet shape, defining intervening grooves and presenting radially extending flat driving faces or shoulders 27, six being shown in the present instance. The teeth may be formed in various ways, as by milling, grinding, or stamping. The radiating driving shoulders 27 have their planes extending parallel to the chuck axis and each is of generally triangular shape converging inwardly, the inner ends of the shoulders being adjacent to the axis of the block, and the width of the shoulder at any given radius from the axis being proportional to the radius. The triangular shoulders are approximately bisected by a plane perpendicular to the axis of the chuck body and passing through the inner ends of the shoulders. The toothed end face of the clutch block thus has a dished appearance. The radiating drive shoulders extend to the apexes of the hexagonal clutch block, thus providing pressure surfaces of relatively long radius.

The toothed clutch block is adapted to engage the end of the cylindrical shank 28 of a drill 29 or other tool inserted into the chuck body opening 11. The end of the drill shank is provided with ratchet-like teeth 30 similar to the clutch block teeth 26 and complementary thereto, the shank teeth having flat radiating driving faces or shoulders 31 adapted to abut against the corresponding shoulders 27 of the clutch block teeth.

When the drill is to be clamped in the chuck, the drill shank is inserted centrally into the chuck body opening 11 into contact with the toothed clutch block 26, whereupon the chuck sleeve 20 is rotated to bring the shank-centering jaws lightly against the shank without clamping the jaws. The shank is then turned slightly, if necessary, in a direction opposite to the driving direction in order to seat the toothed shank end firmly against the block and to bring the shank shoulders 31 against the block shoulders 27. The chuck sleeve 20 is then rotated to bring the jaws 14 firmly against the sides of the drill shank, thus centering and clamping the drill shank. The clamping pressure need not be very heavy as this pressure is not relied on to drive the drill but merely to prevent the drill from falling out of the chuck.

When the chuck is in use, the chuck body is rotated relative to the work and driving torque is transmitted to the drill by the clutch block shoulders 27 engaging the drill shank shoulders 31. The drill is thus positively driven, avoiding slipping of the drill and consequent damage to the drill shank and to the chuck jaws. Drill shanks of various sizes up to the capacity of the chuck may be inserted into the chuck body and will properly engage the clutch block, the length and outer end depth of the radiating shank shoulders increasing with the diameter of the drill shank. It will be understood that either the chuck or the work may be rotated.

The clutch block 24 will not interfere with the use of the chuck in driving a straight shank drill of conventional type. In such case, the clutch block forms a stop for the flat or plain end of the drill shank and the chuck jaws are tightened sufficiently to provide the requisite frictional grip on the drill shank.

What I claim as new and desire to secure by Letters Patent is:

1. In a chuck of the type having shiftably mounted jaws for centering and gripping a cylindrical tool shank, a chuck body carrying said jaws and having an apertured mounting end and an opposite axial opening to receive the tool shank, said chuck body further having an axial opening of non-circular cross-section at the inner end of said tool shank opening and exposed to the mounting end of the chuck body, and a clutch member fitting in said non-circular opening against relative rotation in both directions and being insertible therein from the mounting end of the chuck body, said clutch member having substantially radial teeth at the inner end of said opening forming radiating drive shoulders, said drive shoulders being adapted to engage complementary radiating shoulders on the end of the tool shank.

2. In a chuck of the type having shiftably mounted jaws for centering and gripping a cylindrical tool shank, a chuck body carrying said jaws and having an axial opening to receive the tool shank and further having a central polygonal opening communicating with the inner end of said shank-receiving opening, and a polygonal clutch member fitting in said polygonal opening against relative rotation in both directions and being radially toothed on an end face thereof to form radiating drive shoulders at the inner end of said axial opening, said shoulders being engageable with complementary radiating shoulders on the end of the tool shank.

3. In a chuck of the type having shiftably mounted jaws for centering and gripping a cylindrical tool shank, a chuck body carrying said jaws and having axial openings at opposite ends, one opening to receive a mounting member and the other to receive the tool shank, said chuck body having a non-circular axial opening extending between said end openings, and a non-circular clutch member fitting in said non-circular chuck body opening against relative rotation in both directions and having radiating clutch shoulders at the inner end of said shank-receiving opening. said clutch shoulders being engageable with complementary radiating shoulders on the end of the tool shank, said clutch member being insertible into said chuck body through the opening for the mounting member, and the rearward movement of the inserted clutch member being limited by the mounting member.

4. In a chuck of the type having shiftably mounted jaws for centering and gripping a cylindrical tool shank, a chuck body carrying said jaws and having an axial opening to receive the tool shank and further having an axial opening of polygonal cross-section at the inner end of the tool shank opening, and a clutch member of polygonal cross-section fitting in said polygonal opening against relative rotation in both directions and having substantially radial ratchet-like clutch teeth at the inner end of said tool shank opening presenting radiating drive shoulders, said drive shoulders being engageable with complementary radiating shoulders on the end of the tool shank and said drive shoulders extending to the apexes of said polygonal clutch member.

GEORGE J. MEYER.